United States Patent
Wang et al.

(10) Patent No.: US 9,195,355 B2
(45) Date of Patent: Nov. 24, 2015

(54) METHOD FOR INCREASING ACCURACY OF TOUCH COORDINATE CALCULATION IN A CAPACITIVE MULTI-TOUCH SYSTEM

(71) Applicant: ORISE TECHNOLOGY CO., LTD., Hsinchu (TW)

(72) Inventors: Hsin-Hao Wang, Tainan (TW); Chih-Hung Kung, Miaoli County (TW); Yen-Lin Huang, Taipei (TW)

(73) Assignee: FOCALTECH SYSTEMS CO., LTD., Hsinchu (TW)

(*) Notice: Subject to any disclaimer, the term of this patent is extended or adjusted under 35 U.S.C. 154(b) by 207 days.

(21) Appl. No.: 13/920,285

(22) Filed: Jun. 18, 2013

(65) Prior Publication Data
US 2013/0342502 A1  Dec. 26, 2013

(30) Foreign Application Priority Data
Jun. 20, 2012  (TW) .............................. 101122039 A (51) Int. Cl.
G06F 3/044 (2006.01)
G06F 3/041 (2006.01)

(52) U.S. Cl.
CPC .............. *G06F 3/044* (2013.01); *G06F 3/0416* (2013.01); *G06F 2203/04104* (2013.01)

(58) Field of Classification Search
CPC ................ G06F 2203/041–2203/04113; G06F 3/041–3/047
See application file for complete search history.

(56) References Cited

U.S. PATENT DOCUMENTS

2007/0285404 A1* 12/2007 Rimon et al. .................. 345/173
2009/0174676 A1*  7/2009 Westerman ................... 345/173

\* cited by examiner

*Primary Examiner* — Yong H Sim
(74) *Attorney, Agent, or Firm* — Bacon & Thomas, PLLC (57) ABSTRACT

In a method for increasing accuracy of touch coordinate calculation in a capacitive multi-touch system, it performs operations on obtained data for de-noising of the obtained data and increasing its linearity so as to generate data with excellent stability and linearity. An integral accumulation operation is performed to generate data for each sensing channel, cancel the accumulation error in data, and calculate coordinates for touch points on a capacitive touch panel.

12 Claims, 9 Drawing Sheets

METHOD FOR INCREASING ACCURACY OF TOUCH COORDINATE CALCULATION IN A CAPACITIVE MULTI-TOUCH SYSTEM

BACKGROUND OF THE INVENTION

1. Field of the Invention

The present invention relates to the technical field of touch panels and, more particularly, to a method for increasing accuracy of touch coordinate calculation in a capacitive multi-touch system.

2. Description of Related Art

Current consumer electronics are mostly provided with a touchpad for use as one of the input devices. To meet with the requirement of compactness, a touchpad and a panel are typically combined into a touch panel for users to conveniently input data. Upon the sensing principle, touchpads are divided into four types of resistive, capacitive, surface acoustic wave, and optics, in which the capacitive touch panels are the most popular currently.

Figure 1:
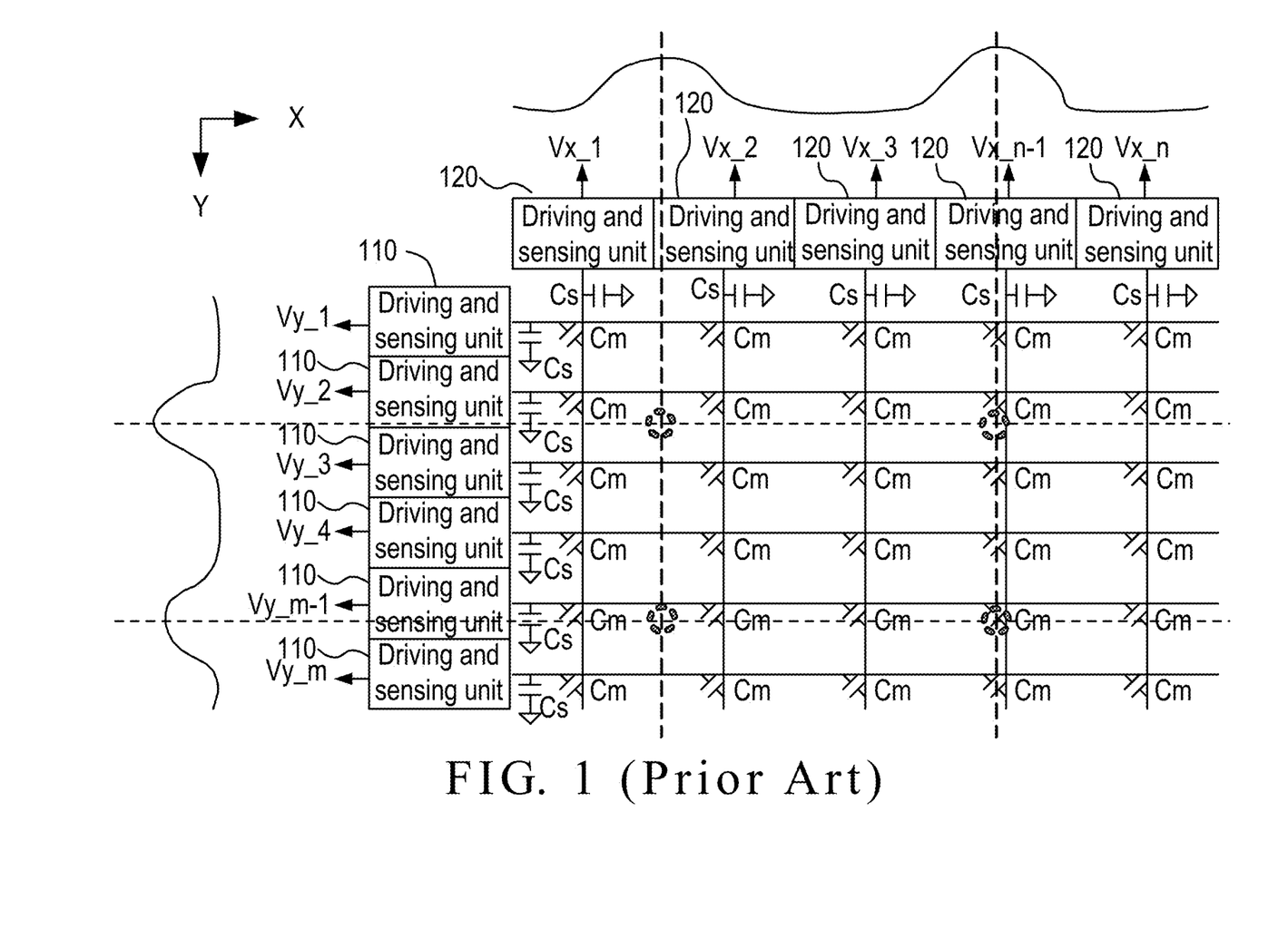
FIG. 1 is a schematic view of a typical self capacitance sensing.

A typical capacitive touch panel is driven by sensing the grounded capacitance on each conductor line. Thus, a change of the grounded capacitance is used to determine whether an object approaches the capacitive touch panel, which is known as a self capacitance sensing. The self capacitance or the grounded capacitance is not a physical capacitor, but parasitic and stray capacitance on each conductor line. FIG. 1 is a schematic view of a typical self capacitance sensing. As shown in FIG. 1, at the first period of time, the driving and sensing units 110 in a first direction drive the conductor lines in the first direction in order to charge the self capacitance of the conductor lines in the first direction. At the second period, the driving and sensing units 110 sense the voltages on the conductor lines in the first direction. At the third period, the driving and sensing units 120 in a second direction drive the conductor lines in the second direction in order to charge the self capacitance of the conductor lines in the second direction. At the fourth period, the driving and sensing units 120 sense the voltages on the conductor lines in the second direction.

The typical self capacitance sensing of FIG. 1 connects both a driving circuit and a sensing circuit on the same conductor line in order to drive the conductor line and sense a signal change on the same conductor line to thereby decide the magnitude of the self capacitance. In this case, the advantage includes a reduced amount of data, rapidly fetching one frame row data, and lower power consumption. However, the disadvantage includes that an error decision on a touch point that is easily caused by a floating conductor on a touch panel, and a ghost point effect due to multiple touch points concurrently on the touch panel.

Figure 2:
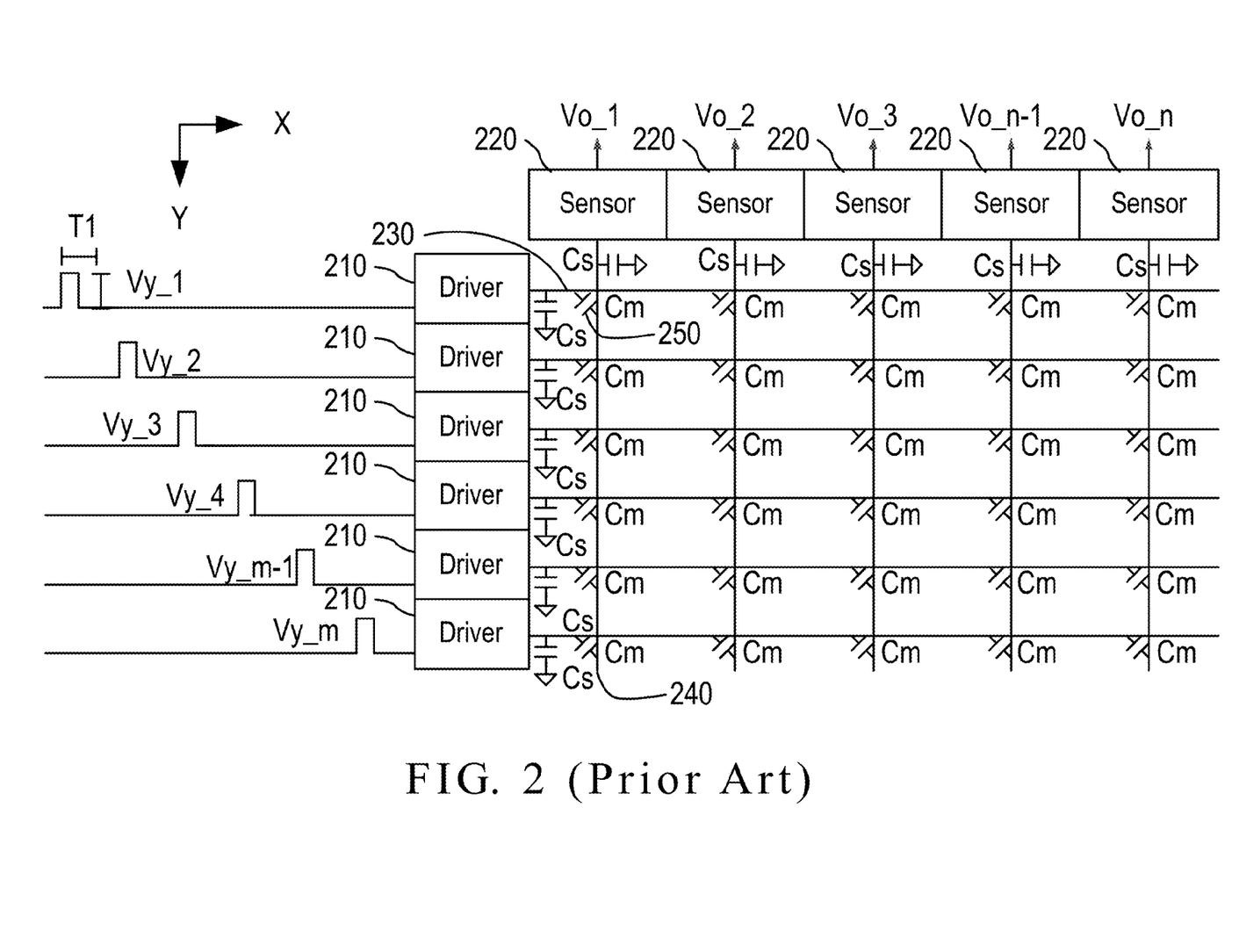
FIG. 2 is a schematic view of a typical mutual capacitance sensing.

With respect to the capacitive touch panel driving method, it senses the magnitude change of mutual capacitance Cm to thereby determine whether the object approaches the touch panel. Likewise, the mutual capacitance Cm is not a physical capacitor but a mutual capacitance between the conductor lines in the first direction and in the second direction. FIG. 2 is a schematic diagram of a typical mutual capacitance sensing. As shown in FIG. 2, the drivers 210 are arranged on the first direction (Y), and the sensors 220 are arranged on the second direction (X). At the upper half of the first period of time T1, the drivers 210 drive the conductor lines 230 in the first direction and use the voltage $V_{y\_1}$ to charge the mutual capacitance (Cm) 250, and at the lower half, all sensors 220 sense voltages ($V_{o\_1}$, $V_{o\_2}$, ..., $V_{o\_n}$) on the conductor lines 240 in the second direction to thereby obtain n data. Accordingly, m*n data can be obtained after m driving periods. In a practical system, the drivers 210 and sensors 220 are integrated into the same integrated circuit (IC) to thereby save the cost.

Such a mutual capacitance sensing can easily determine whether a touch is generated from a human body since a signal generated from a floating conductor is different from a grounded conductor, and when multiple points are concurrently touched. Also, the real position of each point can be found since every touch point is indicated by a real coordinate, so as to easily support the multi-touch application.

However, when an object approaches or touches a touch panel, a serious jitter may appear on the voltage signals sensed by the sensors 220 due to the noises generated on a human body, an environment, and/or a panel. In this case, the calculated touch coordinate is unstable, and the entire signal to noise ratio (SNR) of a touch system is relatively reduced. In addition, at a so-called sensing line direction (i.e., Y direction) in a practical touch system, a touch noise can be induced easily, resulting in affecting the accuracy of a touch coordinate calculation.

Therefore, it is desirable to provide an improved method for increasing accuracy of touch coordinate calculation in a capacitive multi-touch system, so as to mitigate and/or obviate the aforementioned problems.

SUMMARY OF THE INVENTION

The object of the present invention is to provide a method for increasing accuracy of touch coordinate calculation in a capacitive multi-touch system, which can increase the accuracy of a touch coordinate calculation and the SNR of the system.

According to a feature of the invention, there is provided a method for increasing accuracy of touch coordinate calculation in a capacitive multi-touch system. The system includes a capacitive touch panel, a driving and sensing device, an analog to digital converter (ADC), and a controller. The driving and sensing device performs a capacitance driving and sensing. The ADC is connected to the driving and sensing device in order to perform an analog to digital conversion. The controller has a storage unit. The method includes the steps of: (A) the controller initializing the driving and sensing device and the ADC; (B) the driving and sensing device sensing the capacitive touch panel to thereby generate an image raw data; (C) the ADC converting the image raw data into a digital image raw data and storing the digital image raw data into the storage unit; (D) the controller performing a de-noise and up-linearity operation on the digital image raw data to thereby generate a linearized image raw data; (E) the controller performing an integral accumulation operation on the linearized image raw data to thereby generate an integrated image raw data; (F) the controller performing an accumulated error cancellation on the integrated image raw data to thereby cancel an accumulated error of the integrated image raw data and generate a de-accumulation-error image raw data; and (G) the controller performing a touch coordinate calculation based on the de-accumulation-error image raw data to thereby generate a touch coordinate on the capacitive touch panel.

According to another feature of the invention, there is provided a capacitive multi-touch system. The system includes a capacitive touch panel, a driving and sensing device, an analog to digital converter (ADC), and a controller. The capacitive touch panel has a plurality of first conductor lines in a first direction and a plurality of second conductor lines in a second direction. The driving and sensing device is connected to the capacitive touch panel in order to perform a capacitance driving and sensing. The ADC is connected to the driving and sensing device in order to perform an analog to digital conversion on a voltage generated by the capacitance driving and sensing performed by the driving and sensing device. The controller has a storage unit to temporarily store an image raw data generated by the driving and sensing device in sensing the capacitive touch panel, and is based on the image raw data to calculate a touch coordinate on the capacitive touch panel.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
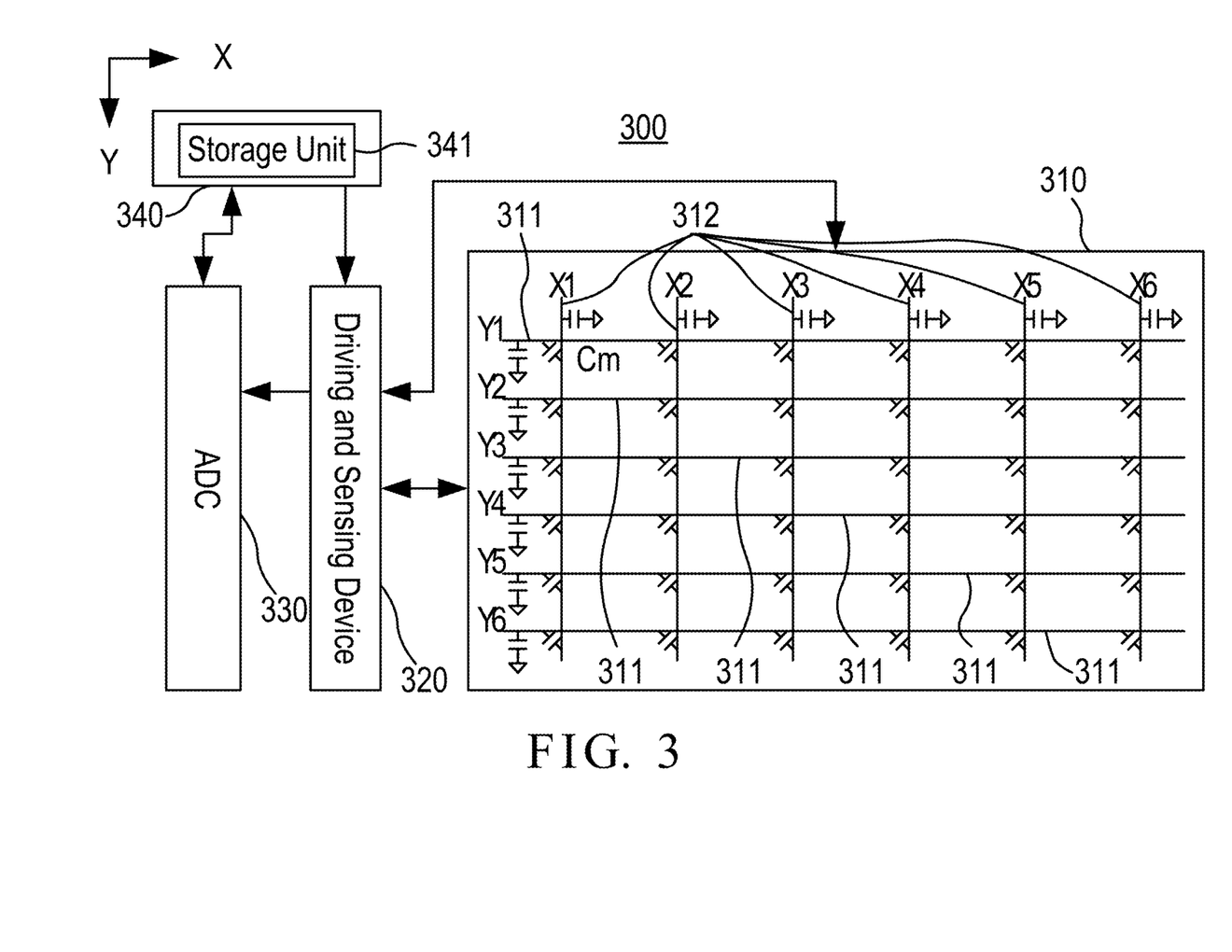
FIG. 3 is a block diagram of a capacitive multi-touch system according to the invention.

FIG. 3 is a block diagram of a capacitive multi-touch system 300 in which the method for increasing accuracy of touch coordinate calculation according to the invention is executed. The capacitive multi-touch system 300 includes a capacitive touch panel 310, a driving and sensing device 320, an analog to digital converter (ADC) 330, and a controller 340.

The capacitive touch panel 310 has a plurality of first conductor lines 311 (Y1-Y6) in a first direction (Y) and a plurality of second conductor lines 312 (X1-X6) in a second direction (X). The driving and sensing device 320 is connected to the capacitive touch panel 310 in order to perform a capacitance driving and sensing. The ADC 330 is connected to the driving and sensing device 320 in order to perform an analog to digital conversion. The controller 340 has a storage unit 341 to temporarily store an image raw data generated by the driving and sensing device 320 in sensing the capacitive touch panel 210, and is based on the image raw data to calculate a touch coordinate on the capacitive touch panel 210.

Figure 4:
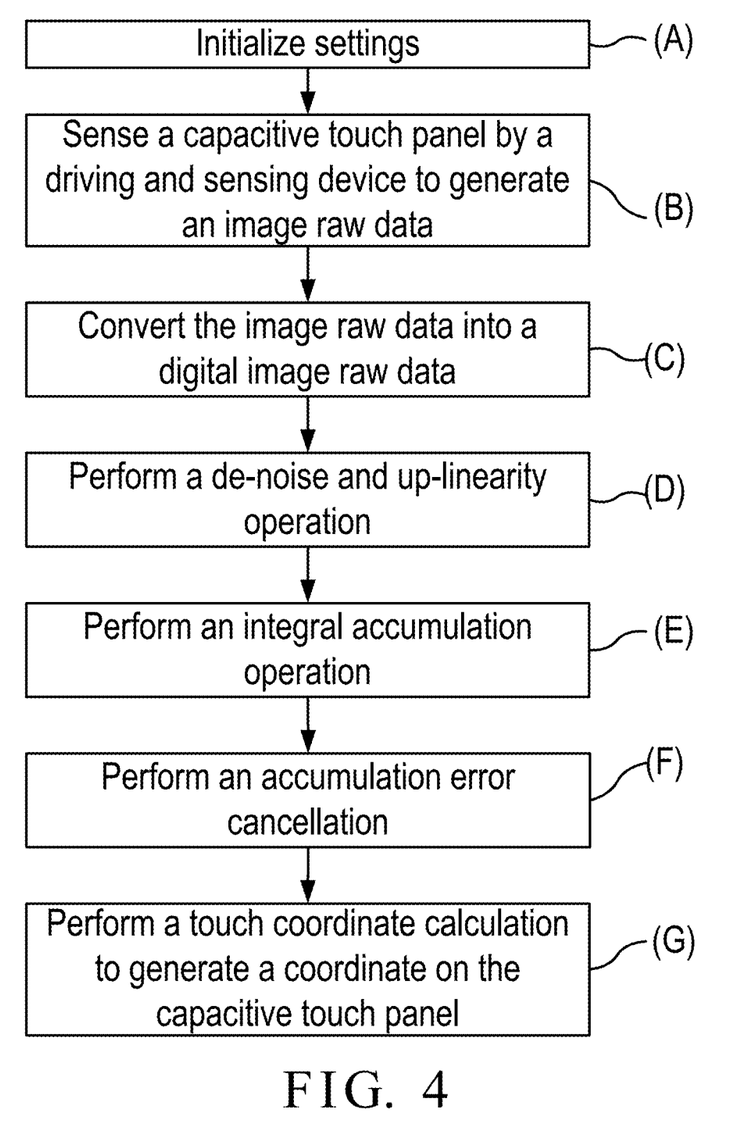
FIG. 4 is a flowchart of a method for increasing accuracy of touch coordinate calculation in a capacitive multi-touch system according to the invention.

FIG. 4 is a flowchart of the method for increasing accuracy of touch coordinate calculation in a capacitive multi-touch system according to the invention. In step (A), the controller 340 initializes the driving and sensing device 330 and the ADC 330, which includes initialization of the driving and sensing device 330 in mutual capacitance driving and sensing in order to set the number, frequency, and type of the driving wave, and initialization of the ADC 330 in order to set the operating frequency.

In step (B), the driving and sensing device 320 senses the capacitive touch panel 310 to thereby generate an image raw data. In this case, the driving and sensing device 320 performs a mutual capacitance driving and sensing to thereby generate the image raw data.

In step (C), the ADC 330 converts the image raw data into a digital image raw data and stores the digital image raw data in the storage unit 341 for allowing the controller 340 to process subsequently. The digital image raw data has m*n data, where n indicates the number of sensors of the driving and sensing device 320, and m indicates the number of drivers of the driving and sensing device 320. Namely, there are m-row, n-column data, or n sensing lines and m driving lines, where each sensing line has m data.

In step (D), the controller 340 performs a de-noise and up-linearity operation on the digital image raw data to thereby generate a linearized image raw data.

Figure 5:
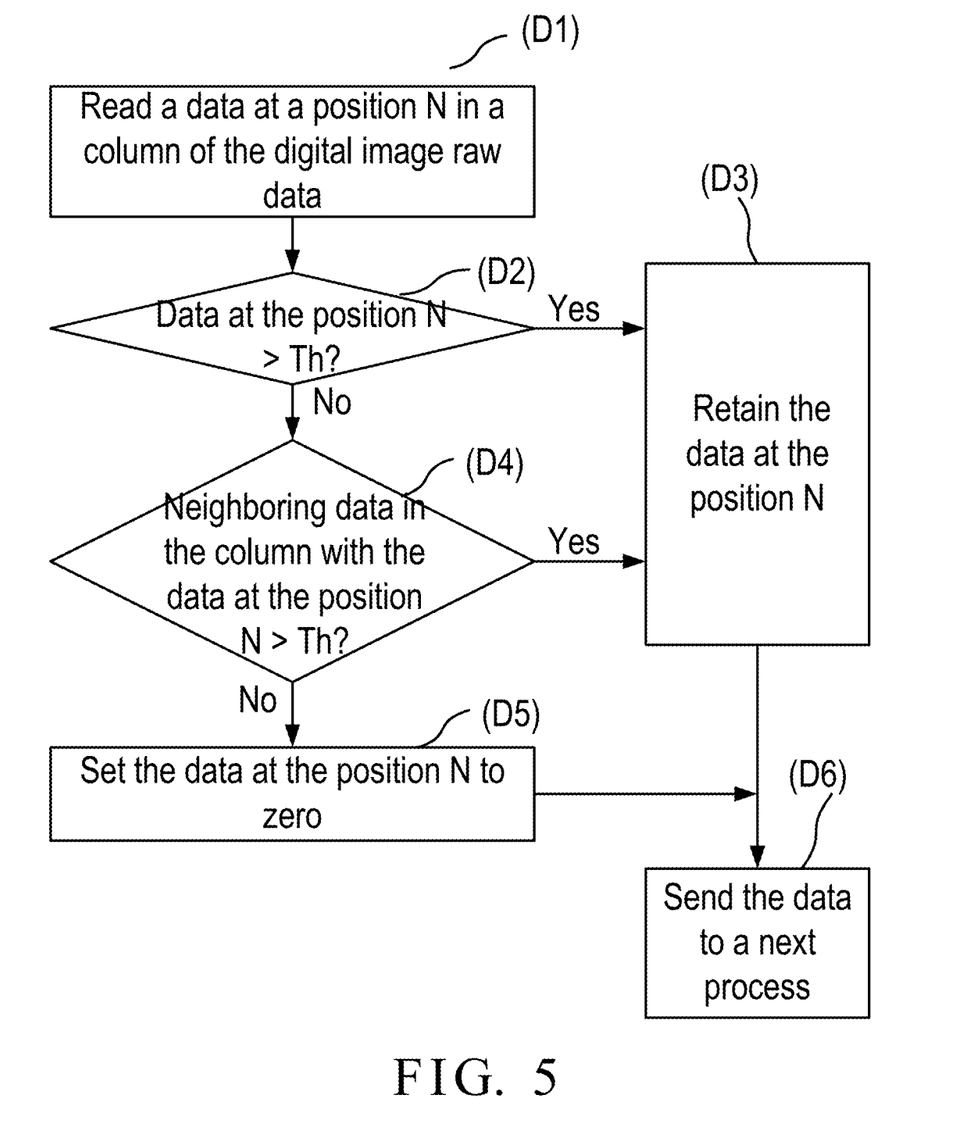
FIG. 5 is a detailed flowchart of a de-noise and up-linearity operation according to the invention.

FIG. 5 is a detailed flowchart of the de-noise and up-linearity operation according to the invention. As shown in FIG. 5, in step (D1), the controller 340 reads a data at a position N in a column of the digital image raw data from the storage unit 341, where N=1, 2, . . . , n.

Step (D2) determines whether the data at the position N exceeds a threshold Th.

Step (D3) retains the data at the position N when step (D2) determines that the data at the position N exceeds the threshold Th.

Step (D4) further determines whether neighboring data in the same column with the data at the position N exceed the threshold Th, when the data at the position N does not exceed the threshold Th. The neighboring data can be upper two and lower two data at the position N in the same column, for example.

Step (D3) retains the data at the position N when step (D4) determines that the neighboring data exceed the threshold Th. Conversely, step (D5) sets the data at the position N to zero, i.e., the data at the position N is reset.

Finally, the data (retained or reset) is sent for subsequent processing.

Figure 6:
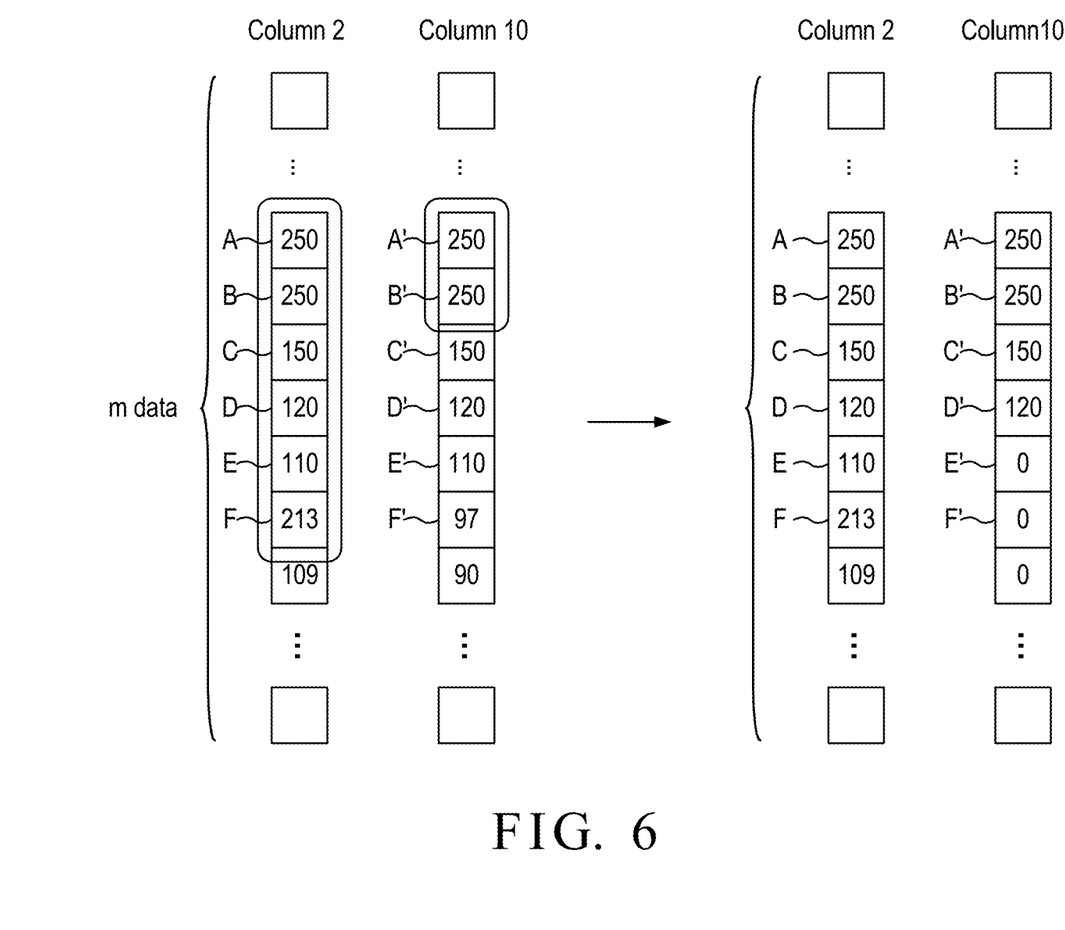
FIG. 6 is a schematic diagram of a de-noise and up-linearity operation according to the invention.

FIG. 6 is a schematic diagram of the de-noise and up-linearity operation according to the invention. In this case, we have the threshold Th=200. As shown in FIG. 6, in column 2, there is a touch at position A and position F since their values are higher. In addition, in column 10, there is a touch at position A' and position B'. The upper two data at position C and position D have at least one over the threshold Th, so that the values are retained. For the lower two data at position E, one of the two data exceeds the threshold Th, so that the values are also retained. For the upper two data at position C' and position D', the values are retained. For the upper two data and the lower two ones at position E', all the values are smaller than the threshold Th, so that the data at position E' is set to zero.

For comparison, in the prior art, when the values at position C, position D, position C', and position D' are smaller than the threshold Th, they are all set to zero, which is likely to cause a discontinuous effect. However, in the invention, the values are retained, as shown in FIG. 6, even they are smaller than the threshold Th, which can increase the linearity so as to avoid the discontinuous effect.

In step (E), the controller 340 performs an integral accumulation operation on the linearized image raw data to thereby generate an integrated image raw data and temporarily store it in the storage unit 341.

Figure 7:
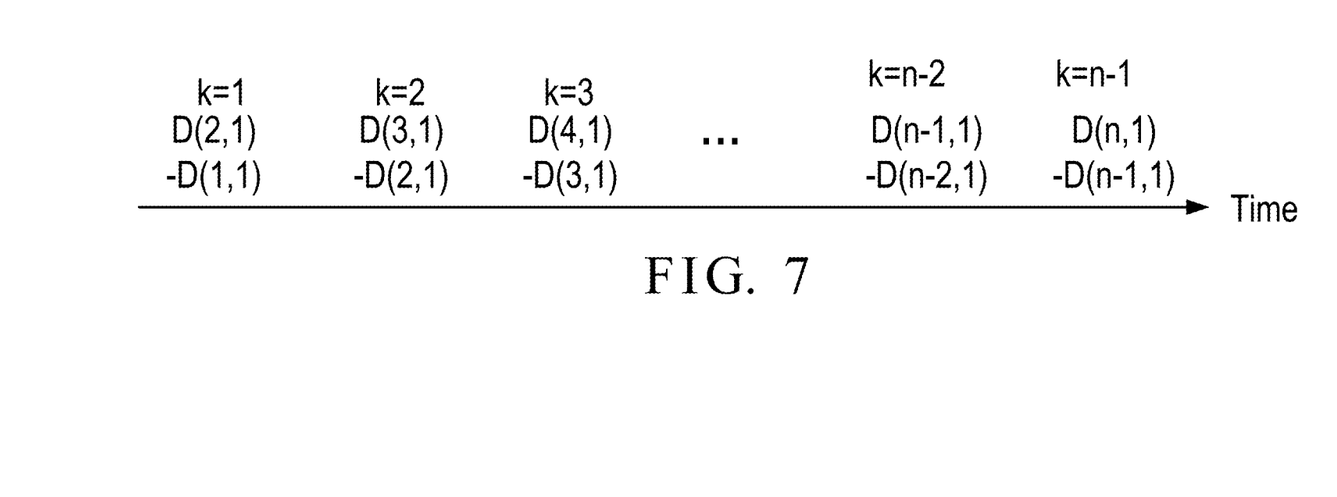
FIG. 7 is a schematic diagram of an operation of the first sensor of a driving and sensing device according to the invention.

The driving and sensing device 320 has n sensors, each performing a subtraction on two successive data to thereby reduce the common noise. FIG. 7 is a schematic diagram of an operation of the first sensor of the driving and sensing device 320 according to the invention. As shown in FIG. 7, the first data is subtracted from the second data, the second data is subtracted from the third data, and so on. Thus, the integral accumulation operation performed on the linearized image raw data in step (E) is required.

Figure 8:
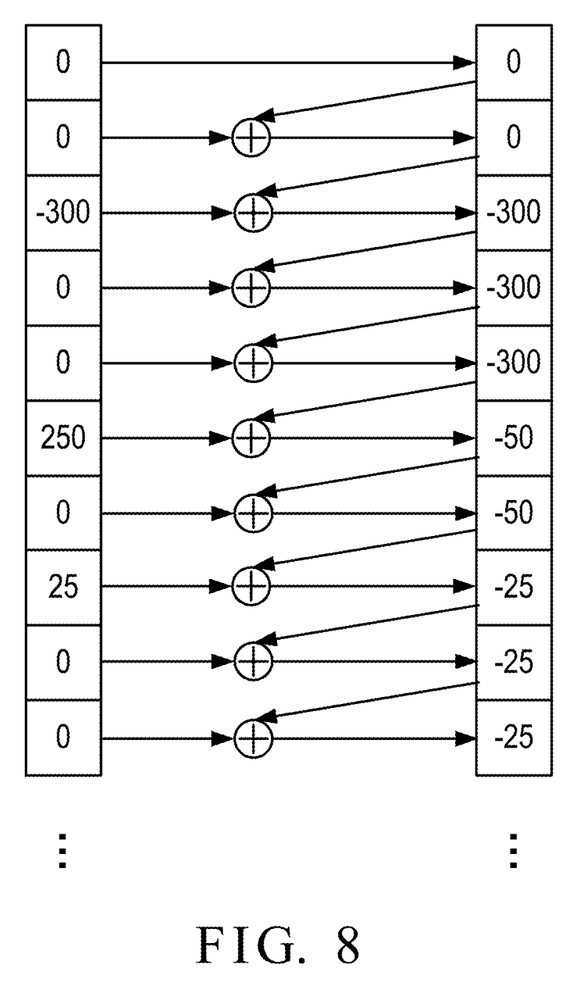
FIG. 8 is a schematic diagram of performing an integral accumulation operation according to the invention.

The integrated image raw data has m*n data. FIG. 8 is a schematic diagram of performing the integral accumulation operation according to the invention. Namely, the driving and sensing device 320 first senses the capacitive touch panel 310, and the detected voltage is converted into the digital image raw data by the ADC 330. The digital image raw data is applied to the de-noise and up-linearity operation to thereby obtain the linearized image raw with higher stability and better linearity. Finally, the signal of each sensor or channel is obtained by the integral accumulation operation.

In another embodiment, after step (E), step (E1) can be executed. Step (E1) performs a positive and negative sign reverse operation to thereby change positive and negative signs of the obtained signals of the sensors for further processing.

In step (F), the controller 340 performs an accumulated error cancellation on the integrated image raw data to thereby cancel an accumulation error of the integrated image raw data and generate a de-accumulation-error image raw data.

Figure 9:
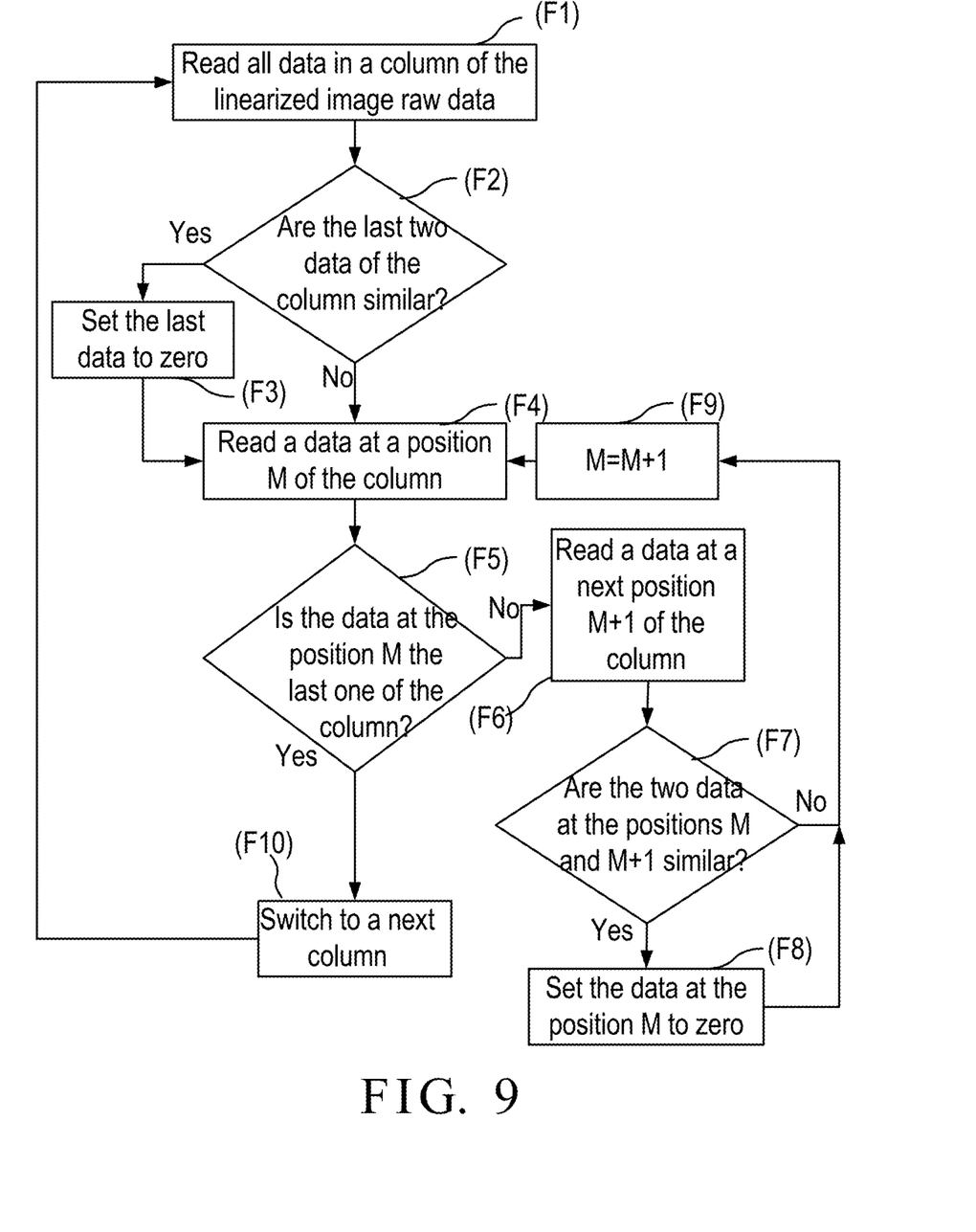
FIG. 9 is a detailed flowchart of performing an accumulation error cancellation according to the invention.

FIG. 9 is a detailed flowchart of performing the accumulation error cancellation according to the invention. In step (F1), the controller 340 reads all the data in a column of the linearized image raw data from the storage unit 341.

In step (F2), the controller 340 determines whether the last two data of the column are similar. Namely, when an absolute value of the difference between the last two data of the column is smaller a first threshold Threshold1, the controller 340 determines that the last two data of the column are similar.

Step (F3) sets the last data of the column to zero when the controller 340 determines that the last two data of the column are similar.

Step (F4) reads a data at a position M of the column, where M=1, 2, ..., m. Since the driving and sensing device 320 has m drivers, each sensing line or each column has m records of data, i.e., m data.

Step (F5) determines whether the data at the position M is the last one of the column.

Step (F6) reads a data at a position M+1 of the column when step (F5) determines that the data at the position M is not the last one of the column.

Step (F7) determines whether the two data at the positions M and M+1 are similar. Namely, when an absolute value of the difference between the two data at the positions M and M+1 is smaller than a second threshold Threshold2, step (F7) determines that the two data at the positions M and M+1 are similar.

Step (F8) sets the data at the position M to zero when step (F7) determines that the two data at the positions M and M+1 are similar, and the process goes to step (F9).

In step (F9), the position M is incremented, i.e., M=M+1, and the process returns to step (F4).

In addition, step (F9) is executed when step (F7) determines that the two data at the positions M and M+1 are not similar.

Step (F10) switches to the next column when step (F5) determines that the data at the position M is the last one of the column, and then the process goes to step (F1) for reading all the data in the next column.

In step (G), the controller 340 performs a touch coordinate calculation based on the de-accumulation-error image raw data to thereby generate a touch coordinate on the capacitive touch panel.

The typical self capacitance or mutual capacitance (Cm) sensing uses the drivers 210 to input the signals and is based on the capacitance changes to sense difference charges by the sensors 220 and generate corresponding voltage signals. Accordingly, an object approaching or touching the touch panel can be determined with a change of the voltage signals. However, the noises caused by a human body, the environment, the drivers on an LCD panel may cause the sensed or detected voltages to have a serious change. After such a changed voltage is converted into a digital signal by the ADC, it can generate an error or instability on a coordinate decision in case of no operation and noise filtering process, resulting in relatively reducing the SNR of the system.

By contrast, the inventive method for increasing accuracy of touch coordinate calculation in a capacitive multi-touch system first performs a de-noise and up-linearity operation on the image raw data that causes the jitter effect, then performs an integral accumulation operation to thereby obtain the signals of each sensor or channel, next cancels the error caused in the data accumulation, and finally performs a coordinate calculation process to thereby generate the touch coordinates, so as to accurately determine whether a conductor or finger touches the capacitive touch panel 310.

As cited, the prior art neither consider the noise and linearity problem, nor does a subtraction of two successive data performed by a sensor to reduce the common noise. Therefore, the power noise cannot be filtered, or the noise changes generated by the first conductor lines 311 (Y1-Y6) in the first direction (Y) and by the second conductor lines 312 (X1-X6) in the second direction (X) cannot be filtered. Further, the error and instability on a coordinate decision appears, and the SNR of the system is relatively reduced. However, the inventive method takes the de-noise and up-linearity into account to thereby reduce the accumulation error caused by the common noise. The calculation accuracy of the touch coordinates on the capacitive multi-touch panel can thus be effectively increased.

Although the present invention has been explained in relation to its preferred embodiment, it is to be understood that many other possible modifications and variations can be made without departing from the spirit and scope of the invention as hereinafter claimed.

What is claimed is:

1. A method for increasing accuracy of touch coordinate calculation in a capacitive multi-touch system, including a capacitive touch panel, a driving and sensing device for performing a capacitance driving and sensing, an analog to digital converter (ADC) connected to the driving and sensing device for performing an analog to digital conversion, and a controller having a storage unit, the method comprising the steps of:

(A) the controller initializing the driving and sensing device and the ADC;

(B) the driving and sensing device sensing the capacitive touch panel to generate an image raw data;

(C) the ADC converting the image raw data into a digital image raw data and storing the digital image raw data into the storage unit;

(D) the controller performing a de-noise and up-linearity operation on the digital image raw data to generate a linearized image raw data, wherein the de-noise and up-linearity operation further comprises:

(D1) reading a data at a position N in a column of the digital image raw data, where N=1, 2, ..., n;

(D2) determining whether the data at the position N exceeds a threshold;

(D3) retaining the data at the position N when step (D2) determines that the data at the position N exceeds the threshold; and (D4) further determining whether neighboring data of the column with the data at the position N exceed the threshold when the data at the position N does not exceed the threshold, and retaining the data at the position N when the neighboring data exceed the threshold, and otherwise setting the data at the position N to zero so as to generate the linearized image raw data;

(E) the controller performing an integral accumulation operation on the linearized image raw data to generate an integrated image raw data;

(F) the controller performing an accumulation error cancellation on the integrated image raw data to cancel an accumulation error of the integrated image raw data and generate a de-accumulation-error image raw data; and (G) the controller performing a touch coordinate calculation based on the de-accumulation-error image raw data to generate a touch coordinate on the capacitive touch panel, wherein the digital image raw data has m*n data, where n indicates a number of sensors of the driving and sensing device, and m indicates a number of drivers of the driving and sensing device;

wherein the accumulation error cancellation further comprises:

(F1) reading all data in a column of the linearized image raw data;

(F2) determining whether the last two data of the column of the linearized image raw data are similar;

(F3) setting the last data to zero when step (F2) determines that the last two data of the column of the linearized image raw data are similar;

(F4) reading a data at a position M of the column of the linearized image raw data, where M=1, 2, ..., m;

(F5) determining whether the data at the position M is the last one of the column of the linearized image raw data;

(F6) reading a data at a next position M+1 of the column of the linearized image raw data when step (F5) determines that the data at the position M is not the last one of the column of the linearized image raw data;

(F7) determining whether the two data at the positions M and M+1 are similar;

(F8) setting the data at the position M to zero when step (F7) determines that the two data at the positions M and M+1 are similar; and (F9) increasing the position M by one and returning to step (F4).

2. The method as claimed in claim 1, wherein the neighboring data indicate upper two and lower two data at the position N in the column.

3. The method as claimed in claim 2, wherein the integrated image raw data has m*n data.

4. The method as claimed in claim 1, wherein step (F9) is executed when step (F7) determines that the two data at the positions M and M+1 are not similar.

5. The method as claimed in claim 1, wherein step (F1) is executed to read a next column of data when step (F5) determines that the data at the position M is the last one.

6. The method as claimed in claim 1, wherein step (F2) determines that the last two data of the column are similar when an absolute value of the difference between the last two data of the column is smaller a first threshold.

7. The method as claimed in claim 1, wherein step (F7) determines that the data at the positions M and M+1 are similar when an absolute value of the difference between the data at the positions M and M+1 is smaller a second threshold.

8. A capacitive multi-touch system, comprising:

a capacitive touch panel, having a plurality of first conductor lines in a first direction and a plurality of second conductor lines in a second direction;

a driving and sensing device connected to the capacitive touch panel, for performing a capacitance driving and sensing;

an analog to digital converter (ADC), connected to the driving and sensing device, for performing an analog to digital conversion on a voltage generated in the capacitance driving and sensing by the driving and sensing device; and a controller, having a storage unit to temporarily store an image raw data generated when the driving and sensing device senses the capacitive touch panel and calculating touch coordinates on the capacitive touch panel according to the image raw data, wherein the controller initializes the driving and sensing device and the ADC, the driving and sensing device senses the capacitive touch panel to generate an image raw data, the ADC converts the image raw data into a digital image raw data and stores the digital image raw data into the storage unit, the controller performs a de-noise and up-linearity operation on the digital image raw data to generate a linearized image raw data, the controller performs an integral accumulation operation on the linearized image raw data to generate an integrated image raw data, the controller performs an accumulation error cancellation on the integrated image raw data to cancel an accumulation error of the integrated image raw data and generate a de-accumulation-error image raw data, and finally the controller performs a touch coordinate calculation based on the de-accumulation-error image raw data to generate the touch coordinates on the capacitive touch panel;

wherein the controller first reads all data in a column of the linearized image raw data, determines whether the last two data of the column of the linearized image raw data are similar, and sets the last data to zero when the last two data of the column of the linearized image raw data are similar, then reads a data at a position M of the column of the linearized image raw data, where M=1, 2, ..., m, determines whether the data at the position M is the last one of the column of the linearized image raw data, and reads a data at a next position M+1 of the column of the linearized image raw data when the data at the position M is not the last one of the column of the linearized image raw data, and finally determines whether the two data at the positions M and M+1 are similar, sets the data at the position M to zero when the two data at the positions M and M+1 are similar, and repeats the above until the de-accumulation-error image raw data is generated.

9. The capacitive multi-touch system as claimed in claim 8, wherein the controller reads a data at a position N in a column of the digital image raw data, where N=1, 2, ..., n, then determines whether the data at the position N exceeds a threshold and retains the data at the position N when the data at the position N exceeds the threshold, and further determines whether neighboring data of the column with the data at the position N exceed the threshold when the data at the position N does not exceed the threshold, and finally holds the data at the position N when the neighboring data exceed the threshold and sets the data at the position N to zero thereby generating the linearized image raw data when the neighboring data do not exceed the threshold, so as to perform the de-noise and up-linearity operation on the digital image raw data to generate the linearized image raw data.

10. The capacitive multi-touch system as claimed in claim 9, wherein the neighboring data indicate upper two and lower two data at the position N in the column.

11. The capacitive multi-touch system as claimed in claim 8, wherein the controller determines that the last two data of the column are similar when an absolute value of the difference between the last two data of the column is smaller a first threshold.

12. The capacitive multi-touch system as claimed in claim 11, wherein the controller determines that the data at the positions M and M+1 are similar when an absolute value of the difference between the data at the positions M and M+1 is smaller a second threshold.

* * * * *